United States Patent [19]

Halter

[11] Patent Number: 5,698,922
[45] Date of Patent: Dec. 16, 1997

[54] STARTER FOR A MOTOR VEHICLE

[75] Inventor: Richard Halter, Corbas, France

[73] Assignee: Valeo Equipment Electriques Moteur, Créteil, France

[21] Appl. No.: 661,720

[22] Filed: Jun. 11, 1996

[30] Foreign Application Priority Data

Jun. 12, 1995 [FR] France .................. 95 07047

[51] Int. Cl.$^6$ .................................. H02K 1/12
[52] U.S. Cl. ..................... 310/166; 310/184; 310/198; 310/208; 310/254; 310/71
[58] Field of Search ......................... 310/184, 198, 310/208, 171, 168, 166, 254, 71

[56] References Cited

U.S. PATENT DOCUMENTS

| 2,866,955 | 12/1958 | Mees et al. | 336/192 |
| 4,151,433 | 4/1979 | Flick | 310/54 |
| 4,446,393 | 5/1984 | Finegold | 310/184 |

FOREIGN PATENT DOCUMENTS 2 417 878  9/1979  France .

OTHER PUBLICATIONS

French Search Report dated 29 Mar. 1996.

*Primary Examiner*—Steven L. Stephan
*Assistant Examiner*—Timothy A. Williams
*Attorney, Agent, or Firm*—Morgan & Finnegan, L.L.P.

[57] ABSTRACT

The invention provides a starter for a motor vehicle of the kind having an inductive winding composed of coils, each forming a magnetic pole of the inductor, in which each coil has a conductor of large cross section wound flat so as to form concentric contiguous turns, and in which the innermost turn of the coil is extended by a folding in the conductor which extends radially towards the outside of the coil, substantially in the plane of the turns and straddling them, wherein, in the area of straddling of the turns, the folding is of a reduced dimension along the axis of the turns so that the axial thickness of the coil in this area is reduced.

5 Claims, 2 Drawing Sheets

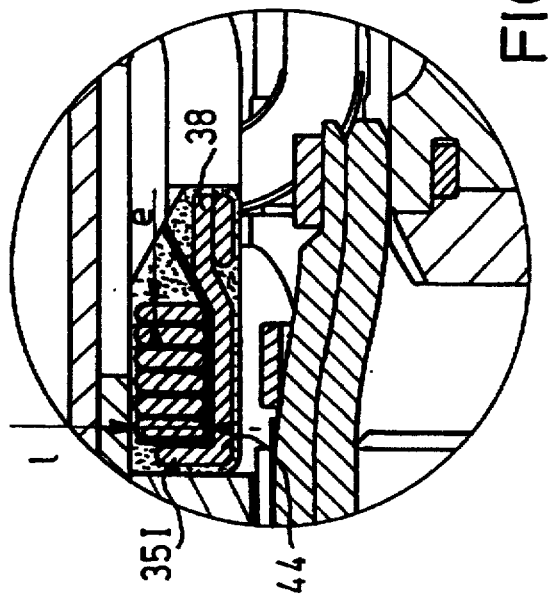
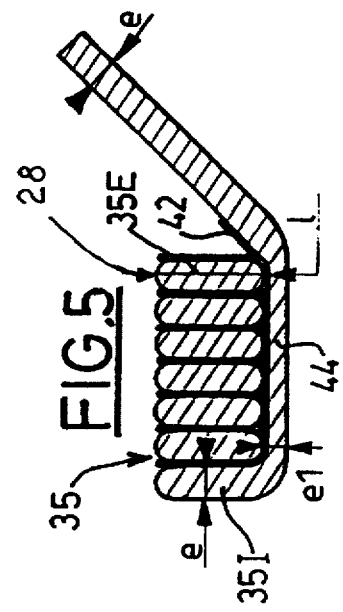
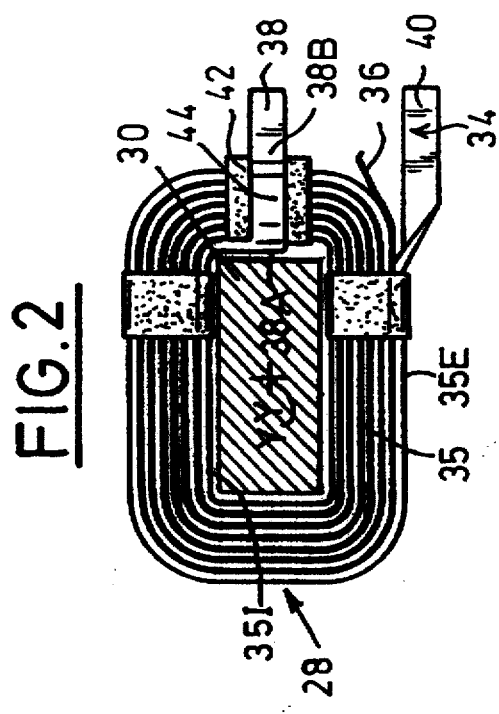
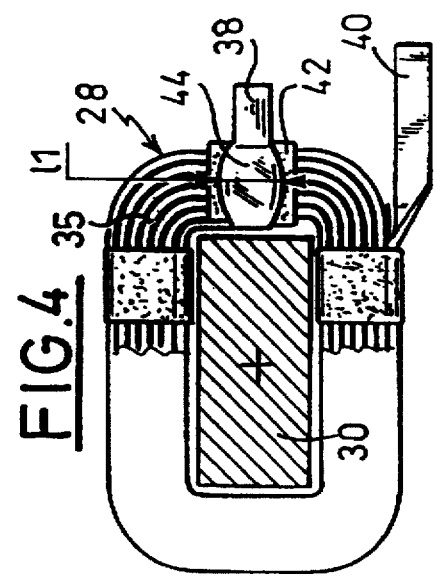

STARTER FOR A MOTOR VEHICLE

BACKGROUND OF THE INVENTION

The invention relates to a starter for a motor vehicle.

More particularly the invention relates to a starter for a motor vehicle of the kind having an inductive winding composed of coils, each forming a magnetic pole of the inductor, in which each coil has a conductor of large cross section wound flat so as to form concentric contiguous turns, and in which the innermost turn of the coil is extended by a folding in the conductor which extends radially towards the outside of the coil, substantially in the plane of the turns and straddling them.

Such a design of the coils of the inductive stator winding allows an intense magnetic field to be obtained, with a reduction in the dimensions of the winding.

In order to obtain even more powerful starters it is necessary to increase the cross section of the conductor forming the coils so as to increase the intensity of the current flowing through the winding in order to obtain a proportional increase in the intensity of the induced magnetic field.

However, to increase the space allocated to passengers in the vehicle, vehicle manufacturers are attempting to minimise the size of the power unit, of which the starter is a part.

Thus it is desirable to provide starters which are as small as possible whilst retaining sufficient power to start the engine.

SUMMARY OF THE INVENTION

With these objects in mind, the invention provides a starter of the kind referred to above, in which, in the area of straddling of the turns, the folding of the conductor is of a reduced dimension along the axis of the turns so that the axial thickness of the coil in this area is reduced.

According to other characteristics of the invention:

the cross section of the flow of current in the conductor is constant at the folding, and the conductor is larger in the transverse direction;

the folding is deformed by flattening in the axial direction of the coil;

the conductor is of approximately rectangular cross section, is wound in the direction of its thickness, the folding is delimited by a double bend in the conductor at the level of the innermost turn which is successively deflected in the axial direction of the turns and then in the radial direction of the turns, and the flattening of the conductor is effected before the second bending operation;

an insulating element is located between the folding of the conductor and the turns of the coil which it straddles.

Other characteristics and advantages of the invention will emerge from a reading of the detailed description which follows, for an understanding of which reference will be made to the accompanying drawings.

BRIEF DESCRIPTION OF THE DRAWINGS

FIG. 2 depicts a coil of an inductive winding manufactured according to the prior art;

FIG. 3 is an enlarged detail of FIG. 1, showing the arrangement of a coil according to the prior art inside the starter;

FIG. 4 depicts a winding coil in accordance with the invention;

FIG. 5 is a cross-sectional view of such a coil.

DETAILED DESCRIPTION OF THE PREFERRED EMBODIMENTS

Figure 1:
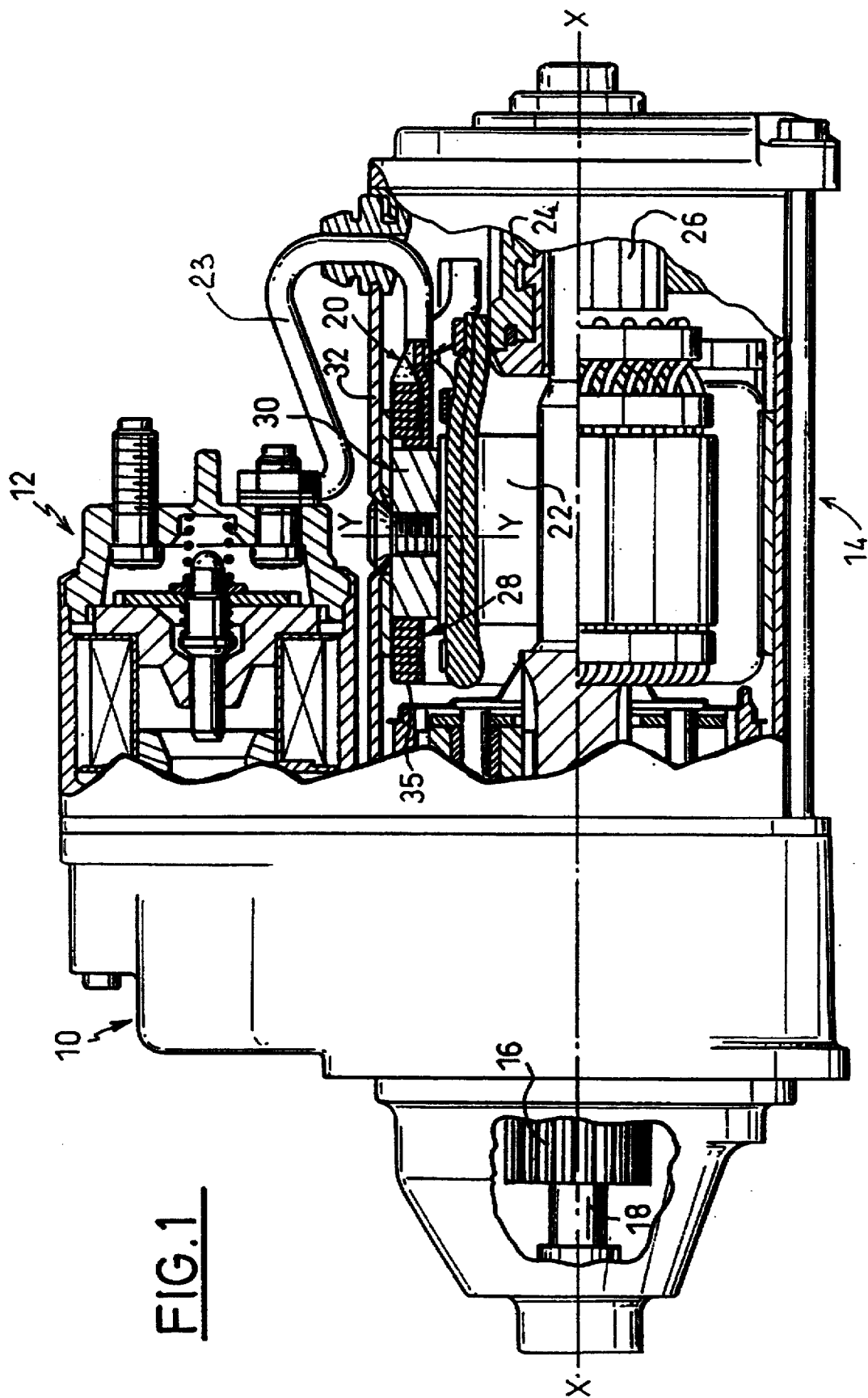
FIG. 1 is a general view in partial axial section of a motor-vehicle starter.

FIG. 1 depicts a starter 10 which essentially includes a contactor 12 and a starter motor 14 designed to drive a starter pinion 16.

The starter pinion 16 is slidably mounted on one end of the driving shaft 18 of the starter, of axis X—X, and the starter pinion 16 is designed to mesh with a toothed wheel (not shown) on a flywheel of the motor vehicle combustion engine fitted with the starter.

The motor 14 of the starter 10 has an inductive stator winding 20 and an induced rotor winding 22 which are coupled electrically in series.

A power supply cable 23 connects the output of the contactor 12 to the input of the inductive winding 20 and the output of the inductive winding 20 is connected to brushes (not shown) which rub against conductive plates 24 of a collector 26 which feeds the induced rotor winding 22.

The inductive winding 20 generally has two pairs of coils 28, such as the one shown in FIG. 2, which are each wound around a pole shoe 30 screwed into the cylindrical casing 32 of the starter motor 14.

Each coil 28 is arranged so that its winding axis Y—Y is arranged radially in the casing 32.

The rotor is mounted in the stator so as to leave a small gap which nevertheless prevents any contact between rotor and stator.

As can be seen notably in FIG. 3, a stator coil 28 consists of a continuous conductor 34, the rectangular cross section of which is of a width "l" greater than its thickness "e".

The conductor 34 is wound around the pole shoe 30 in the direction of its thickness so as to form concentric contiguous turns 35 of increasing diameter.

The turns are electrically insulated from one another by insulating tape 36, the width of which is approximately the same as that of the conductor 34 and which is wound simultaneously with the conductor 34.

The two ends 38, 40 of the conductor 34 extend respectively the innermost turn 35I and the outermost turn 35E of the coil 28 and allow this coil 28 to be connected electrically to another coil, to the power supply cable 23 or to a brush.

The end 40 of the conductor 34 which extends the outermost turn 35E is twisted so that its thickness is brought back into the plane of the turns.

The end 38 of the conductor 34 which extends to innermost turn 35I of the coil 28 is deflected radially towards the outside of the coil 28 by a double bend which, in a first phase 38A, deflects the conductor 34 so as to bring it into a direction parallel to the axis Y—Y of the turns 35 and, in a second phase 38B, deflects the folding radially towards the outside so that it straddles the layers of turns 35.

An insulating pad 42 is interposed between the folding 44 thus formed and the turns of the coil 28.

The coil 28 thus formed can then be connected to the rest of the electrical circuit of the starter motor 14.

As can be seen in FIG. 3, the dimensions of the starter motor 14 are partly related to the dimensions of the coil 28.

This can prove inconvenient when, in order to increase the power of the starter, the cross section of flow of the conductor 34 is increased to allow the passage of currents of greater intensity.

The tendency is then to avoid increasing the thickness of the conductor 34 too much, otherwise the number of turns 35 of the coil 28 would be reduced.

To increase the cross section of the conductor 34 it is therefore necessary to increase essentially its width "l", which consequently increases its radial dimension in the casing 32 of the starter motor 14.

If it is not wished to change the dimensions of the other components of the starter, limitations are rapidly encountered owing to the necessity of maintaining an adequate air gap between the coil 28 and the induced winding 22.

This is particularly critical in the area of the folding 44 of the end 38 of the conductor 34 which is connected to the innermost turn of the coil 28 as in this area the radial dimension of the coil 28 is the sum of the width "l" of the conductor 34 and the thickness "e" of the folding 44 of the end 38 of this same conductor 34.

Thus the invention proposes, as depicted in FIGS. 4 and 5, to reduce the thickness "e" of the conductor 34 in the straddling area 44 by flattening this area in the direction of its thickness in order to reduce it to a thickness "e1" which is smaller than "e".

A reduction in the overall dimensions of the coil 28 inside the starter motor 14 is thus obtained without reducing the cross section of the flow of current, which would have the effect of creating a hot spot in the coil 28 which would be detrimental to the correct functioning of the starter. To this end, the folding 44 has a length "l1" which is greater than the width "l" of the conductor 34.

Preferably provision can be made to carry out this flattening before the phase in which the end 38 is folded over the turns of the coil 28.

The invention has been described in the context of the production of an inductive winding using a separate conductor for each coil.

The principle of the invention could, however, be applied to inductive windings having coils produced continuously with the same conductor 34 but which also feature a straddling area which extends the innermost turn of each coil.

As a variant (not shown), and without departing from the scope of the invention, the reduction in dimensions could be obtained by flattening the coil 28 locally to form a groove which receives the folding 44.

What is claimed is:

1. A starter for a motor vehicle of the kind having an inductive winding composed of coils, each forming a magnetic pole of the inductor, in which each coil has a conductor of large cross section wound flat so as to form concentric contiguous turns, and in which the innermost turn of the coil is extended by a folding in the conductor which extends radially towards the outside of the coil, substantially in the plane of the turns and straddling them, wherein, in the area of straddling of the turns, the folding of the conductor is of a reduced dimension along the axis of the turns so that the axial thickness of the coil in this area is reduced.

2. A starter as claimed in claim 1, wherein the cross section of the flow of current in the conductor is constant, and, at the folding, the conductor is of larger dimension in the transverse direction.

3. A starter as claimed in claim 2, wherein the folding is deformed by flattening in the axial direction of the coil.

4. A starter as claimed in claim 3, wherein the conductor is of approximately rectangular cross section and is wound in the direction of its thickness, the folding being delimited by a double bend in the conductor at the level of the innermost turn which is successively deflected in the axial direction of the turns and then in the radial direction of the turns, and the flattening of the conductor being effected before the second bending operation.

5. A starter as claimed in claim 1, wherein an insulating element is interposed between the folding of the conductor and the turns of the coil which it straddles.

* * * * *